Jan. 3, 1967    R. M. SISK ETAL    3,295,905
ELECTRONIC EQUIPMENT MOUNTING ARRANGEMENTS
Original Filed May 27, 1963

INVENTORS
RICHARD M. SISK
JONAS M. SHAPIRO
BY ROBERT VESCIGLIO
THEODORE WATKIN

Alfred E. Miller
ATTORNEYS

United States Patent Office 3,295,905
Patented Jan. 3, 1967

3,295,905
ELECTRONIC EQUIPMENT MOUNTING
ARRANGEMENTS
Richard M. Sisk, Wilton, Jonas M. Shapiro, Stamford, Robert Vesciglio, Westport, and Theodore Watkin, Stamford, Conn., assignors to Manson Laboratories, Inc., Stamford, Conn., a corporation of Connecticut
Original application May 27, 1963, Ser. No. 283,226, now Patent No. 3,228,532, dated Jan. 11, 1966. Divided and this application Apr. 2, 1965, Ser. No. 445,193
3 Claims. (Cl. 312—273)

The present application is a divisional application of pending patent application Serial No. 283,226, filed May 27, 1963, now Patent No. 3,228,532, and entitled, "Electronic Equipment Mounting and Housing Arrangements."

The present invention relates to electronic equipment mounting arrangements. More particularly, the invention relates to a cable retractor adapted to be utilized with a mounting arrangement for electronic equipment.

The principal object of the present invention is to provide a new and improved cable retractor.

An object of the present invention is to provide a new and improved cable retractor for a mounting arrangement for electronic equipment.

An object of the present invention is to provide an efficient cable retractor.

An object of the present invention is to provide a cable retractor which is of simple but sturdy structure.

In accordance with the present invention, one embodiment of the cable retractor comprises a pair of pivotally mounted arms each having two end portions and pivotally affixed to each other at a first end portion of each of the arms. The second end portion of one of the arms is pivotally affixed to a side of the casing and the second end portion of the other of the arms is pivotally affixed to a slidably mounted support arm of the mounting arrangement.

In order that the present invention may be readily carried into effect, it will now be described with reference to the accompanying drawings, wherein.

In the figures, the same components are indicated by the same reference numerals.

Figure 1:
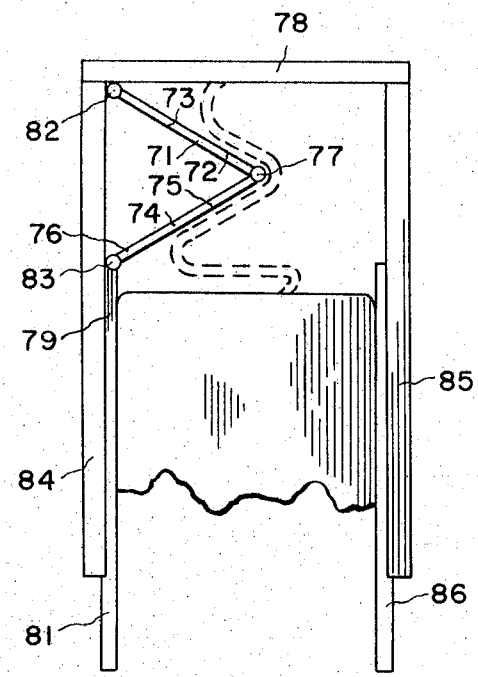
FIG. 1 is a top view of an embodiment of a mounting arrangement and cable retractor of the present invention.
Figure 2:
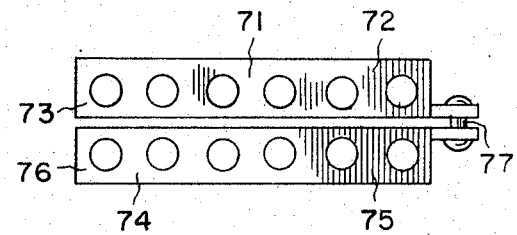
FIG. 2 is a front view of the embodiment of the cable retractor of FIG. 1.

FIG. 1 is a top view of an embodiment of a mounting arrangement and cable retractor of the present invention, and FIG. 2 is a front view of the embodiment of the cable retractor of FIG. 1. In the embodiment of FIGS. 1 and 2, the cable retractor of the present invention comprises a first arm 71 having a first end portion 72 and a second end portion 73 and a second arm 74 having a first end portion 75 and a second end portion 76. The first arm 71 is hinged or pivotally affixed to the second arm 74 at the first end portion 72 of said first arm and the first end portion 75 of said second arm. The first and second arms 71 and 74, respectively, are pivotally affixed to each other by any suitable pivot means 77. The first and second arms 71 and 74 are preferably pivotally affixed to each other in a manner whereby in the fully retracted position thereof they are positioned adjacent to each other in parallel in coplanar relation in a plane substantially parallel to the plane of the back 78 of the casing and in a fully expanded condition they are positioned end-to-end in coplanar relationship in a plane substantially parallel to the plane of one of the sides.

The second end portion 73 of the first arm 71 is pivotally affixed to the casing at a selected portion of the back 78 thereof. The second end portion 76 of the second arm 74 is pivotally affixed to the inner end portion 79 of a support arm 81 slidably mounted on the side of the casing. Any suitable pivot means 82 may be utilized to pivotally affix the first arm to the back of the casing and any suitable pivot means 83 may be utilized to pivotally affix the second arm 74 to the support arm 81. Thus, a force applied to the second arm 74 by the support arm 81 in a direction away from the back 78, such as when the chassis is pulled out of the casing, pivotally moves the first and second arms 71 and 74 to increase the angle between them. A force applied to the second arm 74 by the support arm 81 in a direction toward the back 78, such as when the chassis is returned to or pushed into the casing, pivotally moves the first and second arms 71 and 74 to decrease the angle between them.

The casing may comprise two sides 84 and 85, respectively, supported in position by the back 78. The support arm 81 is slidably mounted on the side 84 and a support arm 86 is slidably mounted in the side 85. The support arms 84 and 85 are adapted to mount and support electronic equipment. Primary and secondary support arms, similar to those of FIG. 3, may be utilized in the embodiment of FIG. 1.

The cable may be supported on either one of the first and second arms 71 and 74, although in FIG. 1 it is positioned on and supported by the first arm 71 between said first arm and the back 78, as shown in broken lines in FIG. 1, and extends to electronic equipment mounted on the support arms 81 and 86. The cable retractor of the present invention is thus of simple structure, but provides an efficient and effective cable retraction function.

Figure 3:
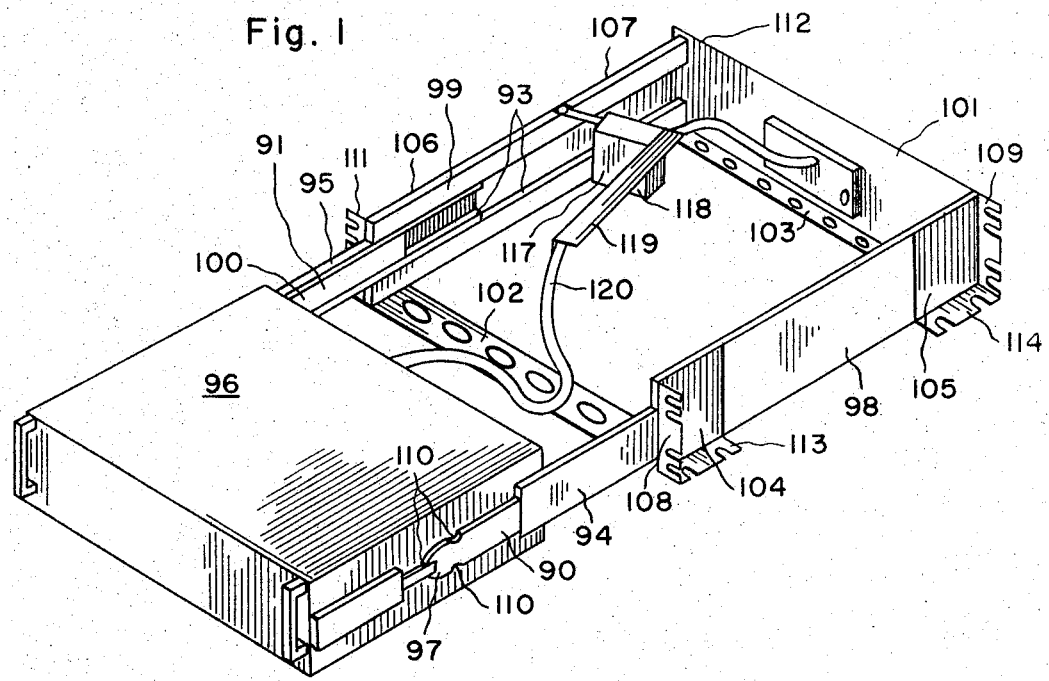
FIG. 3 is a perspective view of another embodiment of a mounting arrangement and cable retractor of the present invention.

FIG. 3 is a perspective view of another embodiment of a mounting arrangement and cable retractor of the present invention. The mounting arrangement, or wrap-around enclosure, as it may be called, comprises an equipment support arrangement 91 and a casing, cover or housing 92. The support arrangement 91 is slidably mounted in the casing 92 by a suitable slide mounting arrangement such as, for example, a track and groove arrangement 93, which permits said support arrangement to move freely from a closed position, in which said support arrangement and equipment are enclosed by said casing, to an extended or open position, in which the said support arrangement extends to its maximum distance from the said casing and the said support arrangement is supported by the said casing by means of said slide mounting arrangement and from its open to its closed position. The extended position of the mounting arrangement of the present invention is that in which said mounting arrangement is shown in FIG. 3.

The support arrangement 91 comprises a pair of spaced parallel primary support arms 94 and 95 positioned to slide into and out of closed position with the casing 92 by means of the slide mounting arrangement 93 and a pair of secondary parallel support arms 90 and 100, slidably mounted on the primary support arms. The primary support arms 94 and 95 and the secondary support arms 90 and 100 of the casing 91 support equipment such as, for example, electronic equipment 96, between them.

The equipment 96 is held in position on the secondary support arms 90 and 100 of the support arrangement 91 by means of readily and rapidly removable holding brackets or by any other suitable holding means (not shown in the figures). The holding brackets may be readily removed to permit rapid removal of the equipment 96 from the casing. The removal of the equipment 96 from the casing may be accomplished in a very short time. When the holding brackets or other holding means are secured to the slide mounting arrangement 93, the equipment 96 moves with the support arrangement 91 from the closed position, in which said support arrangement and equipment are enclosed by the casing 92, to the extended or open position, in which no part of said equipment is enclosed by the said casing and the said support arrangement extends to its maximum distance from the said casing (shown in FIG. 3) and vice versa; the said support arrangement being supported by the said casing by means of said slide mounting arrangement and the said equipment being supported by the said support arrangement.

The holding brackets are affixed either to the equipment 96 or to the support arrangement 91 and are adapted to engage with or be affixed to a corresponding holding portion of said support arrangement or equipment, respectively. In a preferred embodiment of the mounting arrangement of the present arrangement, the holding brackets or their corresponding holding portions are preferably affixed to a tilt slide arrangement 97 which may be formed in each of the secondary support arms 90 and 100.

The tilt slide arrangement 97 may comprise any suitable known positioning means such as, for example, a radially grooved or slotted portion of the secondary support arm and a lug or bracket type member affixed to the equipment 96 and adapted to seat in a selected one of the grooves or slots 110 of the portion 97. If the radial grooves 110 of the portion 97 are formed in the wheel along radii at angles of zero, 45, 90, 135, 180, 225, 270 and 315 degrees, the equipment 96 may be positioned at those angles relative to the support arrangement 91, the axis of each arm of which coincides with the zero angle radius of the portion 97.

In a preferred embodiment of the mounting arrangement of the present invention, the grooves or slots 110 are formed in the portion 97 along 90, 180 and 270 degrees radii, so that the equipment 96, in its extended position, may be positioned inclined at 90 degrees to the primary support arms 94 and 95 and the secondary support arms 90 and 100 of the support arrangement 91; inclined coplanarly with said support arms in the normal extended position (180 degrees to the said arms); or inclined at 270 degrees to the said support arms. The adaptability of the mounting arrangement 91, 92 to support the equipment 96 in several different open positions enables ready repair of either said equipment of said mounting arrangement while said equipment is mounted in said mounting arrangement and while the said mounting arrangement is mounted in a rack or cabinet.

The casing 92 comprises a pair of spaced parallel sides 98 and 99 and a back 101 substantially perpendicular to and joining the sides 98 and 99 to form three sides of a rectangle or, in other words, a rectangular H-shaped housing.

A pair of bench mounting plates 102 and 103 are affixed to the under edges of the sides 98 and 99 of the casing 92 and are in spaced parallel relation to each other in the same plane and parallel to the back 101 of the casing. The bench mounting plates 102 and 103 are substantially perpendicular to the sides 98 and 99 of the casing, each of the bench mounting plates being joined at one end to one side and joined at the other end to the other side. The bench mounting plates 102 and 103 have bench mounting means such as, for example, suitable apertures, slots, grooves, or the like, formed therein to permit mounting of the mounting arrangement on a bench for repair, testing, assembly, or the like.

Mounting brackets 104, 105, 106 and 107 may be affixed to the sides 98 and 99 of the casing 92. The mounting bracket 104 is affixed to an area of the side 98 of the casing 92 adjacent the forward edge of said side; the mounting bracket 105 is affixed to an area of the side 98 of the casing 92 adjacent the back edge of said side; the mounting bracket 106 is affixed to an area of the side 99 of the casing 92 adjacent the forward edge of said side; and the mounting bracket 107 is affixed to an area of the side 99 of the casing 92 adjacent the back edge of said side.

Each of the mounting brackets 104, 105, 106 and 107 has an upright flange portion and an under flange portion. The mounting bracket 104 has an upright flange portion 108; the mounting bracket 105 has an upright flange portion 109; the mounting bracket 106 has an upright flange portion 111; and the mounting bracket 107 has an upright flange portion 112. The mounting bracket 104 has an under flange portion 113; the mounting bracket 105 has an under flange portion 114; the mounting bracket 106 has an under flange portion 115 (not shown in the figures); and the mounting bracket 107 has an under flange portion 116 (not shown in the figures).

The upright flange portion of each mounting bracket has rack or cabinet mounting means such as, for example, suitable apertures, slots, grooves, or the like, formed therein to permit mounting of the mounting arrangement 91, 92 in a rack or cabinet. The under flange portion of each mounting bracket has suitable apertures, slots, grooves, or the like, formed therein to permit mounting of the mounting arrangements to each other in stacks of any desired practical number of said mounting arrangements. When mounted on each other in stacks, the mounting arrangements of the present invention are sturdily mounted in rack or cabinet formation without a rack or cabinet.

The upright and under flange portions 108, 109, 111, 112, 113, 114, 115 and 116 may, of course, be formed directly in and integral with the corresponding sides 98 and 99 of the casing 92 and, indeed, may be dispensed with altogether, if desired. It is economically more feasible, if mounting brackets are desired, however, to utilize separate mounting brackets 104, 105, 106 and 107, as illustrated in FIG. 3, and to affix such separate brackets to the corresponding sides of the casing 92.

A cable retractor 117 is pivotally mounted on a side such as, for example, the side 99, of the casing 92 in the area of said side adjacent the back edge thereof. The cable retractor 117 is pivotally mounted on the side (99) in any suitable known manner such as, for example, by a pivot pin extending through corresponding holes in said retractor and said side (99) thereby forming suitable hinge means enabling the said cable retractor to swing in an arcuate manner relative to the supporting side (99) of the casing 92.

The cable retractor 117 may comprise any suitable configuration adapted to maintain the power cable for the equipment 96 and any other cable and/or wires in disentangled, properly extended condition as well as to protect such cable and/or wires from damage and entanglement by the movement of said equipment from its open position to its closed position.

The cable retractor 117 preferably comprises a hinge plate 118 which is pivotally mounted on a side of the casing 92 in proximity to the back of said casing and is adapted to move arcuately relative to said side of said casing. The cable retractor 117 further comprises an extending member 119 which is affixed to and extends angularly from the hinge plate 118. The extending member 119 preferably extends at right angles from the hinge plate 118 of the cable retractor 117 at an edge thereof and is preferably of L-shaped cross-section and preferably extends from said hinge plate at a corner thereof. When the equipment 96 is moved from its open position to its closed position, the back of said equipment contacts or abuts the hinge plate 118 and the extending member 119 and urges said hinge plate toward the supporting side (99) of the casing 92 and urges said extending member toward the back 101 of said casing, and when the said equipment is in its closed position, the said hinge plate is interposed between and parallel to the adjacent sides of the said equipment and casing and the said extending member is interposed between and parallel to the backs of the said equipment and casing. Thus, a force applied to the cable such as, for example, by the equipment 96 being pulled out of the casing 92, in a direction away from the back 101 pivotally moves the hinge plate arcuately relative to the side 99 and away from said back and a force applied to the extending member 119 in a direction toward said back such as, for example, by the equipment 96 being pushed into the casing 92, pivotally moves said hinge plate arcuately relative to said side and toward said back.

The extending member 119 of the cable retractor 117 supports cable and/or wire 120 on the opposite side of said extending member from the side contacted or abutted by the back of the equipment 96. The cable and/or wire 120 is supported by the extending member 119 of the cable retractor in any suitable manner such as, for example, by supporting hooks or brackets or by a supporting edge or surface of said extending member.

The component members and parts of the mounting arrangement of the present invention are preferably of channel and I-beam configuration and are preferably of aluminum. The utilization of channel and I-beam members as sides and back for the casing 92 imparts great structural strength to the mounting arrangement of the present invention. The configuration of the casing 92 of the mounting arrangement provides great volumetric utilization as well as a dust cover for the equipment. Furthermore, the cost of channel and I-beam members compares favorably with welded members. In an embodiment of the mounting arrangement of the present invention, reinforcing diagonal members (not shown in the figures) may be utilized between the sides and back of the casing 92 so that the great strength of an ideal rectangular box is approached.

Since access to a cabinet through the front is permitted by the mounting arrangement of the present invention, said mountiing arrangement may be utilized where the rear of the cabinet is inaccessible.

In a preferred embodiment of the mounting ararngement of the present invention, the channel and I-beam construction permits mounting of equipment with a panel height of 5⅛ inches.

The metal skin surfaces of the equipment 96 may be removed from the frame of said equipment without electrically disabling said equipment, due to the equipment positioning arrangement of the mounting arrangement.

When the equipment 96 is extended from the casing 92, it may serve as an emergency shelf, in which case the feedthrough connectors for the cables and/or wires 120 are still retained within the equipment assembly and therefore no degradation of performance occurs due to the presence of high power HF fields.

The cable and/or wires 120 may be readily and rapidly disassembled from the cable retractor 117 and may be readily and rapidly removed from the rack. The cables and/or wires 120 are protected from damage and entanglement by the cable retractor 117 which maintains them in the silhouette of the casing 92 as aforedescribed.

While the invention has been described by means of specific examples and in specific embodiments, we do not wish to be limited thereto, for obvious modifications will occur to those skilled in the art without departing from the spirit and scope of the invention.

What we claim is:

1. A mounting ararngement for an electronic equipment unit having a cable connected thereto comprising, in combination, a casing having spaced opposite substantially parallel sides and a back substantially perpendicular to said sides and joined at one end to one side and joined at the other end to the other side;

a pair of support arms adapted to support an electronic equipment unit between them;

mounting means slidably mounting one of said support arms on one of said sides and the other of said support arms on the other of said sides with each support arm in substantially adjacent and parallel relation to the corresponding side and slidable in directions toward and away from the back of said casing; and a cable retractor comprising hinged supporting means for supporting the cable connected to the electronic equipment unit, said hinged supporting means having two ends, means for pivotally supporting said supporting means at one end on the back of said casing, and means for pivotally supporting said supporting means at the other end on one of said support arms in a manner whereby a force applied to said cable by said one of said support arms in a direction away from said back pivotally moves said supporting means arcuately relative to one of the sides of said casing and away from the said back and a force applied to said supporting means by the said one of said support arms in a direction toward said back pivotally moves said supporting means arcuately relative to the said one of said sides and toward the said back.

2. A mounting arrangement for an electronic equipment unit having a cable connected thereto comprising, in combination, a casing having spaced opposite substantially parallel sides and a back substantially perpendicular to said sides and joined at one end to one side and joined at the other end to the other side;

a pair of support arms adapted to support an electronic equipment unit between them;

mounting means slidably mounting one of said support arms on one of said sides and the other of said support arms on the other of said sides with each support arm in substantially adjacent and parallel relation to the corresponding side and slidable in directions toward and away from the back of said casing; and a cable retractor comprising a first arm having a first end portion and a second end portion, a second arm having a first end portion and a second end portion, means hinging said first and second arms to each other at their first end portions, means for supporting the cable connected to the electronic equipment unit on one of said first and second arms, means for pivotally supporting said first arm at its second end portion on the back of said casing, and means for pivotally supporting said second arm at its second end portion on one of said support arms in a manner whereby a force applied to said second arm by said one of said support arms in a direction away from said back pivotally moves said first and second arms to increase the angle between them and a force applied to said second arm by the said one of said support arms in a direction toward said back pivotally moves said first and second arms to decrease the angle between them.

3. A mounting arrangement for an electronic eauipment unit having a cable connected thereto comprising, in combination, a casing having spaced opposite substantially parallel sides and a back substantially perpendicular to said sides and joined at one end to one side and joined at the other end to the other side;

a pair of support arms adapted to support an electronic equipment unit between them;

mounting means slidably mounting one of said support arms on one of said sides and the other of said support arms on the other of said sides with each support arm in substantially adjacent and parallel relation to the corresponding side and slidable in directions toward and away from the back of said casing; and a cable retractor comprising a first arm having a first end portion and a second end portion, a second arm having a first end portion and a second end portion, means hinging said first and second arms to each other at their first end portions in coplanar relationship, means for supporting the cable connected to the electronic equipment unit on one of said first and second arms, means for pivotally supporting said first arm at its second end portion on the back of said casing, and means for pivotally supporting said second arm at its second end portion on one of said support arms so that in a fully retracted condition said first and second arms are positioned in parallel in coplanar relation in a plane substantially parallel to the plane of the back of said casing and in a fully expanded condition said first and second arms are positioned end-to-end in coplanar relation in a plane substantially parallel to the plane of said one of said sides and a force applied to said second arm by asid one of said support arms in a direction away from said back pivotally moves said first and second arms to increase the angle between them and a force applied to said second arm by the said one of said support arms in a direction toward said back pivotally moves said first and second arms to decrease the angle between them.

References Cited by the Examiner

UNITED STATES PATENTS

| | | | |
|---|---|---|---|
| 2,426,502 | 8/1947 | Haupt | 174—69 X |
| 2,865,979 | 12/1958 | Klassen | 174—52 X |
| 3,120,411 | 2/1964 | Strumpell | 174—69 |
| 3,133,768 | 5/1964 | Klakovich | 308—3.6 |
| 3,138,655 | 6/1964 | Navarro et al. | 174—69 |

FOREIGN PATENTS 732,501 6/1955 Great Britain.

CHANCELLOR E. HARRIS, *Primary Examiner.*

CLAUDE A. LE ROY, FRANK B. SHERRY,
*Examiners.*

F. DOMOTOR, *Assistant Examiner.*